United States Patent [19]
Backlin et al.

[11] 4,337,954
[45] Jul. 6, 1982

[54] WEAR SLEEVE OIL SEAL

[75] Inventors: Robert R. Backlin, Dolton; Jerome L. Berti, Chicago Heights, both of Ill.

[73] Assignee: Allis-Chalmers Corporation, Milwaukee, Wis.

[21] Appl. No.: 196,472

[22] Filed: Oct. 14, 1980

[51] Int. Cl.³ .......................... F16J 15/16; F16J 15/54
[52] U.S. Cl. ................................... 277/237 R; 277/32; 277/208
[58] Field of Search .................... 277/12, 32, 138, 224, 277/237, 189.5, 152, 153, 208, DIG. 4

[56] References Cited
U.S. PATENT DOCUMENTS

| | | | |
|---|---|---|---|
| 1,811,588 | 6/1931 | Moreau | 277/DIG. 4 X |
| 2,571,500 | 10/1951 | Trevaskis | 277/32 |
| 2,879,112 | 3/1959 | Cox | 308/41 |
| 2,888,279 | 5/1959 | Rogers | 277/237 X |
| 3,388,913 | 6/1968 | Tracy | 277/32 |

*Primary Examiner*—Robert S. Ward, Jr.
*Attorney, Agent, or Firm*—Arthur L. Nelson

[57] ABSTRACT

An inner peripheral seal ring on the inner periphery of a wear sleeve to seal axial flow of oil and permit heat radially transferred through the wear sleeve for cooler operation of the seal on the wear sleeve.

10 Claims, 3 Drawing Figures

WEAR SLEEVE OIL SEAL

BACKGROUND OF THE INVENTION

This invention relates to a wear sleeve and more particularly to a local application of a seal ring on the inner periphery of the wear sleeve to provide a narrow inner peripheral seal and allowing heat transfer through the major portion of the wear sleeve for cooler operation of the shaft within the wear sleeve.

Sleeve journals have been used on the various machinery to provide a replaceable sleeve on the shafts which encounters the greatest wear. A seal may wear a groove in a crankshaft while the crankshaft may still have considerable life. A replaceable wear sleeve restores the seal and extends the life of the crankshaft. The Cox patent, U.S. Pat. No. 2,879,112, is an illustration of a replaceable sleeve on a shaft in which the sleeve can be replaced when a predetermined amount of wear is incurred by the shaft of the bushing in the bearing box. Replaceable sleeves are also used with seals in which the wear sleeve has a seal on its total inner periphery which engages the external periphery of the shaft to form an oil seal on the shaft end. A sealing means may also be provided on a wear sleeve in which the sleeve is made of a mild steel and forced on a shaft with an interference fit between the wear sleeve and the shaft. One problem with this type of a seal, however, is that the peripheral surfaces of the shaft or the wear sleeve may have defects caused by scratches, interruptions, or unevenness which present a problem under the circumstances where an oil leak cannot be tolerated.

Accordingly, a rubber sleeve between the interface to seal the wear sleeve with the shaft is usually provided. This form of a seal, however, it also produces an insulation between the wear sleeve and the shaft and causes the shaft to run at a higher temperature than normal. Accordingly, the application of a seal ring on a small portion of the shaft or inner periphery of the wear sleeve will overcome the problem of heat transfer from the shaft to the wear sleeve and provide cooler operating condition for the shaft and sleeve. The seal ring is of a soft material such as rubber, soft plastic, epoxy, etc.

Accordingly, it is an object of this invention to provide a wear sleeve with a peripheral seal ring on the inner periphery of the wear sleeve and a metal to metal interface on the major portion of the inner periphery of the wear sleeve to provide the good heat transfer.

It is another object of this invention to provide a wear sleeve having an inner periphery formed with a seal ring over a limited interface between the wear sleeve and the shaft and the major portion of the interface formed by a metal to metal contact for good heat transfer from the shaft through the wear sleeve.

It is a further object of this invention to provide a wear sleeve formed with an annular recess at the end of the inner periphery which engages a chamfered end on the shaft to form a positive seal between the interface of the seal and the shaft and a metal to metal contact of the remaining portion of the interface for good heat transfer from the shaft to the wear sleeve.

The object of this invention is accomplished by providing a wear sleeve on the end of a shaft. The end of the shaft is formed with a chamfer or other form of recess and the end of the wear sleeve is formed with a taper or lip producing a recess or entraped area on the inner periphery of the wear sleeve. A seal ring is formed in the recess of the wear sleeve which engages the chamfer or end of the shaft to form oil seal preventing axial flow between the wear sleeve and the shaft. A major portion of the interface between the shaft and wear sleeve is a metal to metal interface providing good heat transfer from the shaft through the sleeve of the sealed assembly.

The preferred embodiments of this invention are illustrated in the attached drawings.

Figure 1:
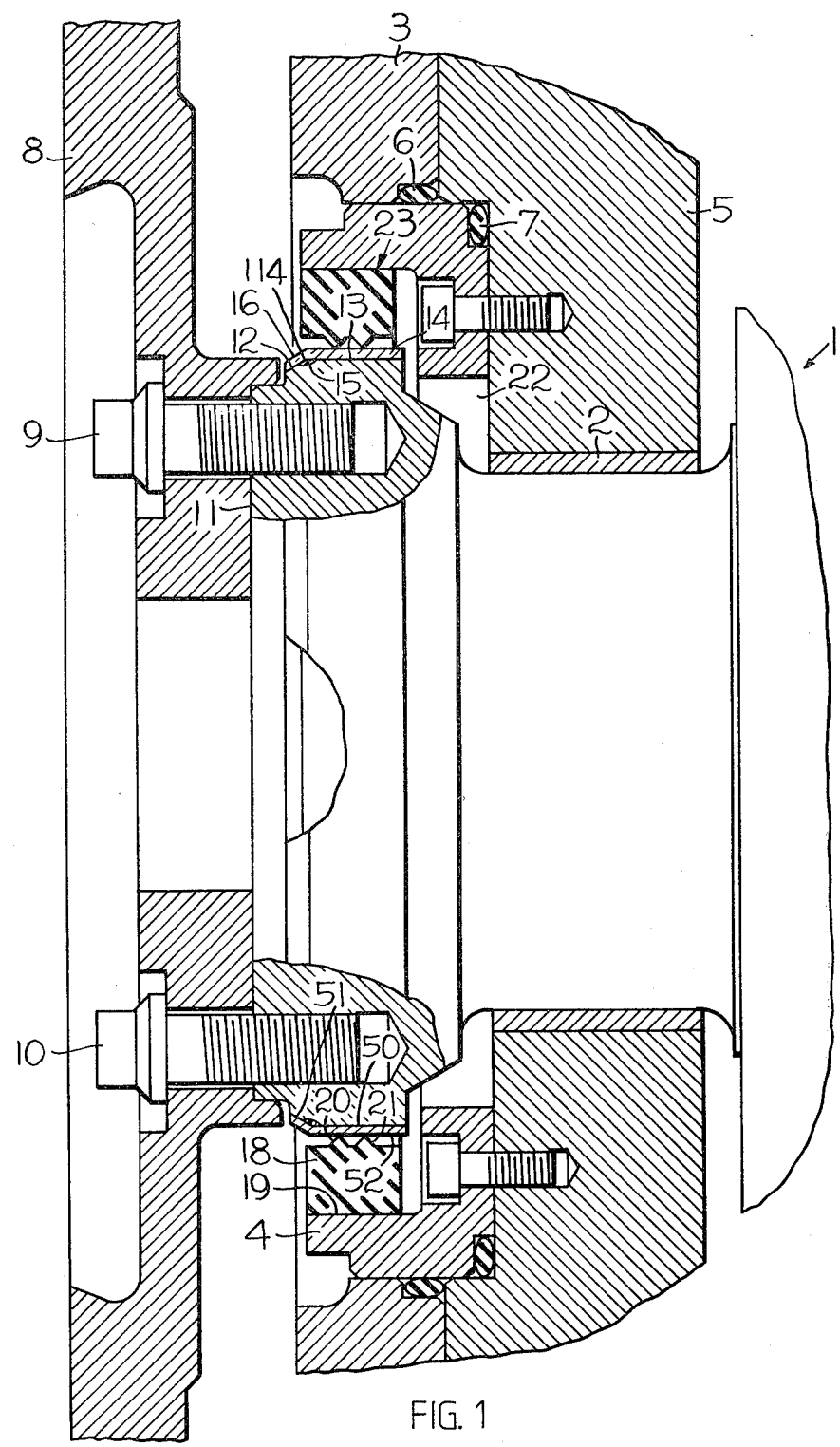
FIG. 1 illustrates a rotating crankshaft and wear sleeve in an engine.

FIG. 1 illustrates a rotating crankshaft 1 rotatably mounted in a main bearing shell 2 of bearings mounted on the block 5 of an internal combustion engine. A seal retainer 4 is shown bolted to the engine block 5 or may be bolted to the flywheel housing 3 and the retained O-rings 6 and 7 provide a positive seal between these components. The main bearing journal (part of block 5) has the conventional two bushing shells supporting the crankshaft 1.

Figures 2, 3:
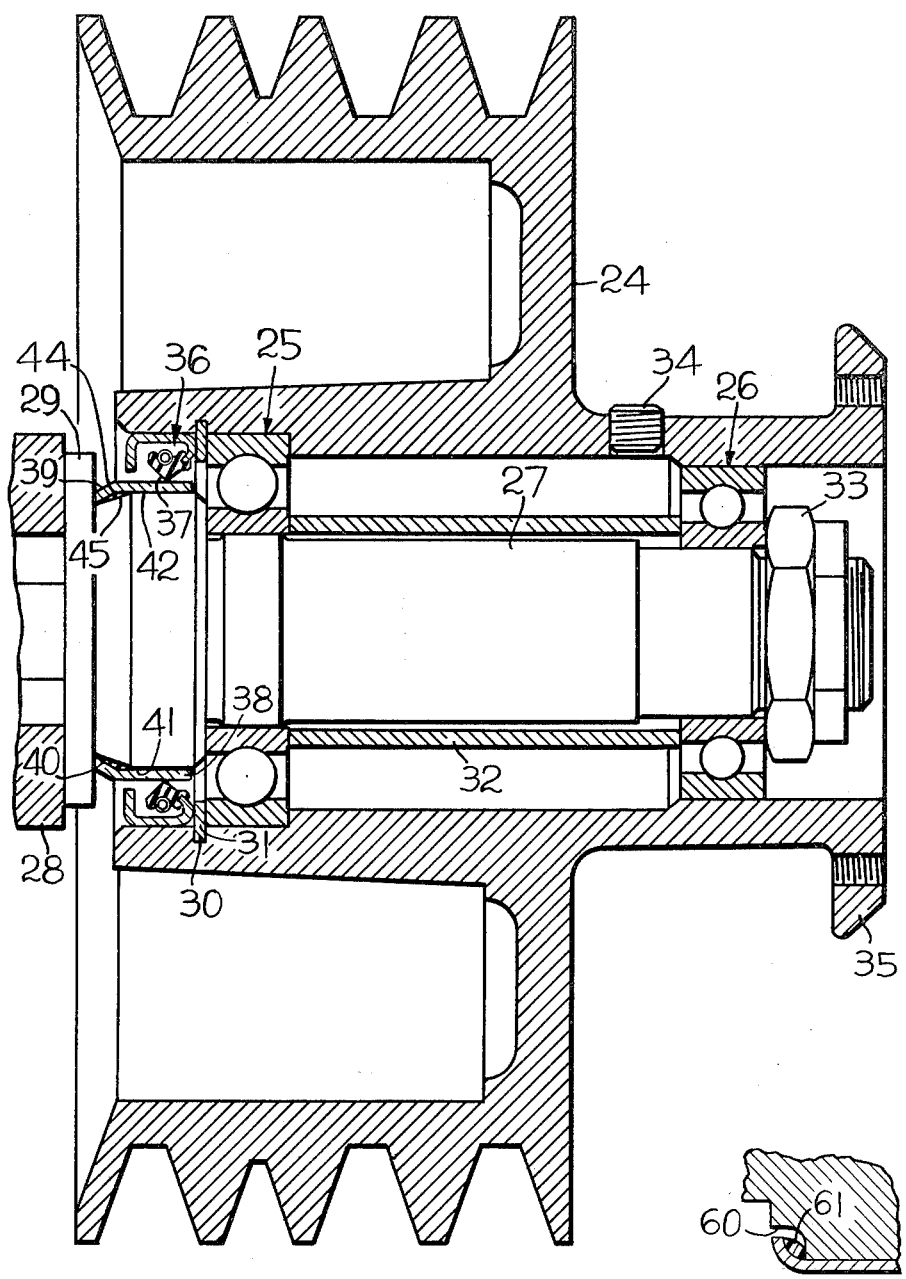
FIG. 2 illustrates a stationary shaft and wear sleeve rotatably supporting a pulley.
FIG. 3 illustrates a modification of the wear sleeve in which the sealing ring is received in a recess of the shaft.

The fly wheel 8 is bolted by a plurality of bolts 9 and 10 to the end facing 11 of the crankshaft 1. The crankshaft 1 is formed with a chamfer 12 or 40 as shown in FIG. 1 or 2, recess 60 as shown in FIG. 3 on the end of the shaft and a cylinderical facing 13. The wear sleeve 14 embraces the cylinderical facing 13 and chamfer 12 of crankshaft in its operating position. A seal ring 114 is bonded or otherwise entrapped to the inner periphery of the wear sleeve 14 in the recess 15 formed by the tapered portion 16 on the end of the wear sleeve 14. The seal ring 114 forms a seal preventing axial flow of oil between the inner periphery of the wear sleeve and external periphery of the crankshaft 1.

The oil seal 18 is retained on the inner periphery 19 of the seal retainer 4 and is formed with one or more ridges similar to 20 and 21. Accordingly, the chamber 22 within the crank case and engine block is sealed through the seal assembly 23.

FIG. 2 illustrates a similar arrangement, however, the housing formed by the pulley 24 rotates on the bearing assemblies 25 and 26. The shaft 27 is a stationary element in this assembly in which the shaft extends into the housing 28 where it is fastened by suitable means. The spacer 29 abuts the housing 28 and embraces the shaft 27 where it extends into the housing 28. The snap ring 30 on the inner periphery of the pulley 24 engages the radial facing 31 of the bearing assembly 25. The spacer 32 between the bearing assemblies 25 and 26 maintains the spacings between the bearings when the locking nut 33 is fastened on the end of the shaft 27. The assembly of the nut, bearings, shaft and spacer are all locked in the assembled position by the lock nut 33.

The plug 34 provides an opening to the bearings for lubrication and servicing.

The pulley 24 is normally fastened on the engine for the belt drive and suitable driven mechanism can be applied to the hub 35. The inner periphery of the pulley 24 embraces an oil seal 36 having an inner periphery ridge 37 forming an oil seal on the external periphery on the wear sleeve 38. The wear sleeve 38 is formed with a tapered portion 39 as it extends over the chamfer 40 of the shaft from the cylindrical facing 41 on the shaft 27. The inner periphery 42 of the wear sleeve 38 is formed with a recess 44 which receives a seal ring 45. The seal ring 45 can be constructed of any suitable sealing material such as rubber which forms a seal or sleeve which is pressed on the shaft 27.

FIG. 3 illustrates a modification wherein a recess 60 is formed in the shaft in place of a chamfer to receive the sealing ring 61. This modification can be used with either device shown on FIG. 1 or FIG. 2.

The sealing device will be described in the following paragraphs.

Referring to FIG. 1, the wear sleeve 14 is pressed on the shaft 1. A metal to metal interface 50 provides an interference fit between the wear sleeve 14 and the shaft 1. The chamfer 12 engages the tapered inner periphery 51 pressing the seal ring 114 in firm engagement with the edge of the chamfer 12. This seal is a fluid tight seal providing an oil seal between the wear sleeve 12 and the shaft 1. Normally, the wear sleeve is constructed of a mild steel which can be deformed slightly as it is pressed on the end of the shaft. The wear sleeve also provides an external surface 52 subject to wear which in time may cause wear grooves because of the constant engagement with the seal ridges 20 and 21. Since the wear sleeve 14 is replaceable, it may be removed from the shaft and be replaced, if excessive wear is encountered on the sleeve and also if the oil seal 23 is defective it can also be replaced on the inner periphery of the seal retainer 4. The assembly provides a fluid tight seal for the crank case chamber 22 and also a metal to metal interface between the wear sleeve and crankshaft to permit radial flow of heat from the seal through the wear sleeve and thus cooler operating conditions for the seal lips and wear sleeve.

FIG. 2 is a similar arrangement in which the pulley 24 forming the housing of the seal assembly is a rotating member. The wear sleeve 38 is also forced on the shaft 27 with an interference fit forming a fluid tight seal by the seal ring 45 on the inner facing of the wear sleeve 38. The oil seal 36 on the internal periphery of the pulley is formed with a single ridge or multiple lips forming an oil seal axially on the external periphery of the wear sleeve. The wear sleeve 38 and the oil seal 36 can be replaced if excessive wear is encountered. The seal assembly provides a fluid tight seal on the end of a pulley or other rotating member and also provides good heat transfer through the wear sleeve and replaceable components for servicing of the seal assembly.

The embodiments of the invention in which an exclusive property or privilege is claimed are defined as follows:

1. A sealed wear sleeve assembly comprising, a shaft, a wear sleeve receiving said shaft, a sealing ring on the inner periphery of said wear sleeve engaging the outer periphery of said shaft and forming a seal, said wear sleeve and shaft forming a metal to metal interface for the greater portion of a mutual engagement, a housing encircling said wear sleeve, an oil seal on the inner periphery of said housing engaging said wear sleeve to thereby provide a sealed wear sleeve assembly.

2. A sealed wear sleeve assembly set forth in claim 1 wherein the end of said shaft forms a recess means for receiving said sealing ring.

3. A sealed wear sleeve assembly as set forth in claim 1 wherein said shaft end forms a chamfer means, a tapered end portion on said wear sleeve defining a recess receiving said sealing ring to form the oil seal in said assembly.

4. A sealed wear sleeve assembly as set forth in claim 1 wherein said wear sleeve defines a recessed end forming an annular recess on its inner periphery, said sealing ring formed in said annular recess for supporting a seal between said shaft and said wear sleeve.

5. A sealed wear sleeve assembly as set forth in claim 1 wherein said sealing ring defines an elastic type seal.

6. A sealed wear sleeve assembly as set forth in claim 1 wherein said oil seal defines a rubber like seal for engaging said wear sleeve.

7. A sealed wear sleeve assembly as set forth in claim 1 wherein said shaft defines a rotating shaft.

8. A sealed wear sleeve assembly as set forth in claim 1 wherein said housing defines a rotating housing rotatably mounted on said shaft.

9. A sealed wear sleeve assembly as set forth in claim 1 wherein said shaft defines a crankshaft.

10. A sealed wear sleeve assembly as set forth in claim 1 wherein said housing defines a rotating pulley means rotatably mounted on said shaft.

* * * * *